(12) United States Patent
Cook

(10) Patent No.: US 12,422,794 B2
(45) Date of Patent: Sep. 23, 2025

(54) GENERATING DIGITAL TWIN SYSTEMS FOR MULTIPHYSICS SYSTEMS

(71) Applicant: Rockwell Automation Technologies, Inc., Mayfield Heights, OH (US)

(72) Inventor: Michael D. Cook, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 349 days.

(21) Appl. No.: 17/933,314

(22) Filed: Sep. 19, 2022

(65) Prior Publication Data

US 2023/0144325 A1 May 11, 2023

Related U.S. Application Data

(60) Provisional application No. 63/263,724, filed on Nov. 8, 2021.

(51) Int. Cl.
G05B 13/04 (2006.01)
(52) U.S. Cl.
CPC .................................. G05B 13/042 (2013.01)
(58) Field of Classification Search
CPC ..... G05B 13/042; G05B 13/048; G05B 17/02
See application file for complete search history.

(56) References Cited

U.S. PATENT DOCUMENTS

| | | | | |
|---|---|---|---|---|
| 2020/0192327 | A1* | 6/2020 | Khoo | G05B 19/4069 |
| 2021/0248825 | A1* | 8/2021 | McBain | G06T 17/20 |
| 2022/0180019 | A1* | 6/2022 | Chong | G06F 30/20 |
| 2022/0404797 | A1* | 12/2022 | El-Ferik | G05B 19/416 |

OTHER PUBLICATIONS

Astrom et al, Feedback Systems, Aug. 2011, Princeton University Press, Chapter 2, 5 and 7 (Year: 2012).*
Astrom, Karl J. et al. "Chapter Two System Modeling", Feedback Systems: An Introduction for Scientists and Engineers, 28 Septmber 2012, XP093057996, retrieved from the internet: URL:http://www.cds.caltech.edu/~murray/books/AM08/pdf/am08-modeling_28Sep12.pdf; retrieved on Jun. 26, 2023.

(Continued)

Primary Examiner — Tameem D Siddiquee
(74) Attorney, Agent, or Firm — Fletcher Yoder, P.C.

(57) ABSTRACT

A method includes receiving one or more process inputs and one or more process outputs associated with one or more operations of one or more components of an industrial automation system. The method also includes determining a model representative of the one or more components based on the one or more process inputs and the one or more process outputs; identifying a boundary response time threshold associated with an unmeasured operating parameter of the one or more components based on the one or more process outputs; determining one or more inputs to modify the one or more operations of the one or more components based on the boundary response time threshold; and receiving one or more measured outputs of the one or more components after providing the one or more inputs to the model, the one or more measured outputs are acquired before the boundary response time threshold.

20 Claims, 6 Drawing Sheets

(56) References Cited

OTHER PUBLICATIONS

Astrom, Karl J. et al. "Chapter Six State Feedback", Feedback Systems: An Introduction for Scientists and Engineers, Sep. 28, 2012, p. 69, XP093057997, retrieved from the internet: URL:http://www.cds.caltech.edu/~murray/books/AM08/pdf/am08-statefbk_28Sep12.pdf.
Astrom, Karl J. et al. "Chapter Seven Output Feeback", Feedback Systems: An Introduction for Scientists and Engineers, Sep. 28, 2012 (Sep. 28, 2012), XP093057998, retrieved from the internet: URL:http://www.cds.caltech.edu/~murray/books/AM08/pdf/am08-outputfbk_28Sep12.pdf.
European Search Report; EP Application No. 22204169.1; dated Jun. 26, 2023.

\* cited by examiner

GENERATING DIGITAL TWIN SYSTEMS FOR MULTIPHYSICS SYSTEMS

CROSS REFERENCE TO RELATED APPLICATION

This application claims priority to and the benefit of U.S. Provisional Patent Application Ser. No. 63/263,724, entitled "Digital Twin System," filed Nov. 8, 2021, that is incorporated herein by reference in the entirety.

BACKGROUND

The present disclosure generally relates to control systems and, more particularly, to control systems using parameter estimation and determining experimental operations based on process data for monitoring, diagnostics, control, and optimization of processes.

Generally, a control system may facilitate performance of an industrial automation process by controlling operations of one or more automation devices. For example, to facilitate performing an industrial automation process, the control system may determine a control action and instruct an automation device (e.g., a rod-pump) to perform the control action. Additionally, the control system may facilitate monitoring performance of the process to determine whether the process is operating as desired. When not operating as desired, the control system may also facilitate performing diagnostics on the process to determine a cause of undesired operation.

In some instances, the control system may utilize a model predictive control (MPC) system to optimize performance of the process by generating and manipulating a process model to transition the process from a current operating state to a desired operating state over a control horizon (e.g., future time steps). However, training and/or verifying the process model to model may prove to involve an inefficient use of computing resources (e.g., energy, processing power, storage). As such, it may be desirable to provide improved systems and methods for training, retraining, and verifying the process model in real time or near real time to increase the efficiency in which the industrial automation system operates.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

BRIEF DESCRIPTION

Figure 1:
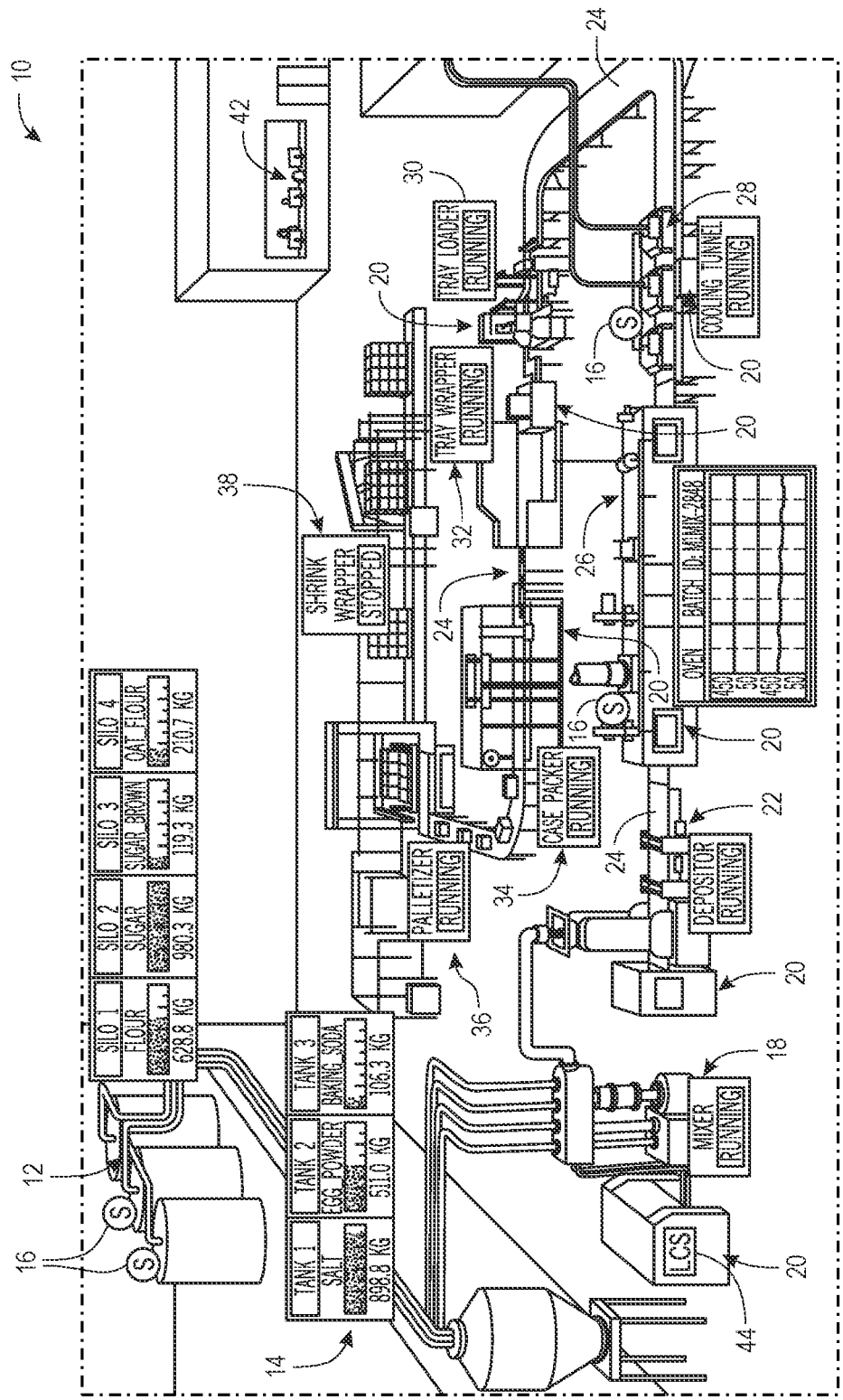
FIG. 1 illustrates an example industrial automation system employed by a food manufacturer, in accordance with an embodiment.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, the present disclosure relates to a method. The method includes receiving, via one or more processors, one or more process inputs and one or more process outputs associated with one or more operations of one or more components of an industrial automation system. The method also includes determining, via the one or more processors, a model representative of the one or more components based on the one or more process inputs and the one or more process outputs. Further, the method also includes identifying, via the one or more processors, a boundary response time threshold associated with an unmeasured operating parameter of the one or more components based on the one or more process outputs. Even further, the method includes determining, via the one or more processors, one or more inputs to modify the one or more operations of the one or more components based on the boundary response time threshold. Even further, the method includes providing, via the one or more processors, the one or more inputs to the model. Even further, the method includes receiving, via the one or more processors, one or more measured outputs of the one or more components after providing the one or more inputs to the model, wherein the one or more measured outputs are acquired at a time period below the boundary response time threshold. Even further, the method includes receiving, via the one or more processors, one or more predicted outputs from the model based on the one or more inputs. Even further, the method includes determining, via the one or more processors, the unmeasured operating parameter based on a state estimator configured to employ the one or more predicted outputs and the one or more measured outputs to determine the unmeasured operating parameter. Further still, the method includes modifying, via the one or more processors, the one or more operations of the one or more components based on the unmeasured operating parameter.

In another embodiment, the present disclosure relates to a non-transitory computer-readable medium comprising computer-executable instructions that, when executed, are configured to cause a processor to perform operations including one or more process inputs and one or more process outputs associated with one or more operations of one or more components of an industrial automation system. The operations also include determining a model representative of the one or more components based on the one or more process inputs and the one or more process outputs. Further, the operations include identifying a boundary response time threshold associated with an unmeasured operating parameter of the one or more components based on the one or more process outputs. Even further, the operations include identifying a boundary response time threshold associated with an unmeasured operating parameter of the one or more components based on the one or more process outputs. Even further, the operations include identifying a boundary response time threshold associated with an unmeasured operating parameter of the one or more components based on the one or more process outputs; determining one or more inputs to modify the one or more operations of the one or more components based on the boundary response time threshold. Even further, the operations include providing the one or more inputs to the model. Even further, the operations include receiving one or more measured outputs of the one or more components after providing the one or more inputs to the model, wherein the one or more measured outputs are acquired at a time period below the boundary response time threshold. Even further, the operations include receiving one or more predicted outputs from the model based on the one or more inputs. Even further, the operations include determining the unmeasured operating parameter based on a state estimator configured to employ the one or more predicted outputs and the one or more measured outputs to determine the unmeasured operating parameter. Further still, the operations include modifying the one or more operations of the one or more components based on the unmeasured operating parameter.

In yet another embodiment, the present disclosure relates to a non-transitory computer-readable medium comprising computer-executable instructions that, when executed, are configured to cause a processor to perform operations including receiving one or more process inputs and one or more process outputs associated with one or more operations of one or more components of an industrial automation system. The operations also include determining a model representative of the one or more components based on the one or more process inputs and the one or more process outputs. Further, the operations include identifying a boundary response time threshold associated with an unmeasured operating parameter of the one or more components based on the one or more process outputs. Even further, the operations include receiving an operating parameter from a sensor monitoring the one or more components that is controlled based on the model. Even further, the operations include determining that the operating parameter is outside of an operating parameter range associated with the model. Even further, the operations include performing a frequency sweep test, in accordance with the boundary response time threshold, based on the operating parameter being outside of the operating parameter range associated with the model. Even further, the operations include identifying an asymptote based on the frequency sweep test. Even further, the operations include determining that the operating parameter is indicative of a linear time invariant (LTI) system or linear time variant (LTV) system based on the asymptote. Even further, the operations include determining one or more additional parameters outside of the operating parameter range based on the operating parameter being indicative of the linear time invariant (LTI) or linear time variant (LTV) system. Even further, the operations include modifying the model based on the one or more additional parameters. Further still, the operations include adjusting operation of the one or more components in accordance with the modified model.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

In some instances, a control system may utilize a model predictive control (MPC) system to optimize performance of an industrial automation process by generating and manipulating a process model to transition a state of the process from a current operating state to a desired operating state over a control horizon (e.g., future time steps). Certain operating states, parameters, or values of the industrial automation process may not be measured (e.g., unmeasured operating states, unmeasured operating parameters, or unmeasured operating values). For example, the unmeasured operating states may not be measurable, whether due to operating conditions (e.g., temperature, frequency) that are outside of a measuring range of sensors, a location being physically inaccessible to a sensor, and the like. As such, a user may provide observational inputs to adjust the model used in the MPC system to account for unmeasurable operating states. However, providing observational inputs to adjust the model may prove to involve an inefficient use of time and computing resources (e.g., energy, processing, power, and storage). As such, it may be desirable to provide improved systems and methods for adjusting models with observational inputs.

With this in mind, the present disclosure is directed to a digital twin control system. In general, the digital twin control system provides a digital twin of a physical industrial automation component that provides a model representative of a performance of the physical industrial automation component (e.g., via visualized on a graphical-user interface (GUI)) based on the physical parameters of the industrial automation component (e.g., physical dimensions of one or more subcomponents of the industrial automation component, a power output by a motor used to control the industrial automation component, a motion profile of the industrial automation component, and the like). More specifically, the digital twin control system may be capable of determining unmeasured operating states associated with industrial automation components, equipment, or machines. In general, the unmeasurable or unmeasured operating states refer to process data that is not currently being measured, which may be due to the sensor data being outside of a range of sensors, a difficulty to position a sensor such that the process data may be measured, and the like. For example, a motor may have electrical sensors that measure power output by the motor, however, it may be difficult to measure the torque applied by an arm driven by the motor. As such, the disclosed digital twin control system may enable determination of the torque and other physical parameters (e.g., rotational velocity, linear velocity, position, load inertia, jerk, linear acceleration, rotational acceleration, and the like), thermal parameters (e.g., a temperature of contacting surfaces between two machine components), electrical parameters (e.g., power, current, and the like), or a combination thereof. Further, the digital twin control system may be capable of determining how modifications or adjustments to physical parameters or dimensions of industrial automation components (e.g., adjusting the radius of a wheel, the length of an arm applying torque, and the like) may affect measured states, process outputs, and/or the unmeasured operating states. In some embodiments, the digital twin control system may provide a dynamic model of the one or more industrial automation components. For example, the digital twin control system may periodically iterate through various operating parameters and determine operating parameters that are expected to produce a measurable change in the industrial process. If the digital twin control system determines that a discrepancy between subsequent process input and output (e.g., received after the model is verified) and a predicted model state is above a threshold, the digital twin control system may determine that an anomaly is present and modify operation of the industrial control system (e.g., output an alert, deactivate equipment, modify an operating parameter of equipment operating in the industrial process). As referred to herein, "verifying" a model may include training the model and determining that the model is representative of a system (e.g., the error of the model is below a threshold). In this way, the digital twin control system may improve performance of an industrial system by enabling real-time modifications of the model representative of a physical industrial automation component to further optimize performance of the industrial system.

As described in more detail herein, the disclosed digital twin control system may utilize the process inputs and/or process outputs to facilitate control and optimization of the industrial automation component based on unmeasured operating states. For example, an industrial automation system may have sensors that measure electrical usage data (e.g., a voltage) of particular device, however the industrial automation system may not have sensors that measure the temperature of a particular component (e.g., a pivot point on an arm used with the industrial system). Accordingly, and as described in further detail herein, the disclosed digital twin control system may determine values relating to unmeasurable or otherwise unmeasured operating states. For example, the digital twin control system may utilize process inputs and process outputs to determine a state estimator (e.g., an observer gain) that is generally an operator utilized by a model (e.g., a verified model that represents an industrial automation components) to determine unmeasured operating states. An example process for determining the state estimator is described in more detail with respect to FIG. 6.

Additionally or alternatively, the digital twin control system may utilize the process inputs, the process outputs, the unmeasured operating states (e.g., unmeasured values), or a combination thereof to determine how physical modifications (e.g., adjusting the length of an arm of a component), electrical modifications (e.g., adjusting the power provided by a motor), thermal modifications (e.g., adding insulation to certain portions), or a combination thereof may affect the performance of the industrial automation system. An example process for determining the how an adjustment to one or more components of the industrial automation system may effect performance of the industrial automation system is described in more detail with respect to FIG. 7.

In some embodiments, the digital twin control system may utilize one or more modules to perform the operations described herein. As used herein, the term "module" may correspond to any suitable set of software instructions, code, or component that performs a particular task or set of tasks. In addition, the "module" may also refer to a hardware component designed to perform the particular task or the set of tasks. For example, the digital twin control system may include an estimator module that utilizes the state estimator to estimate unmeasured operating parameters or states. In some embodiments, the digital twin control system may include an experimental design module capable of determining how modifications to the industrial automation system may modify (e.g., increase or decrease) performance of the industrial automation system. In this way, the disclosed digital twin control system may determine values that are not tracked (i.e., values that are not actively measured by sensors), which may be useful for controlling or improving the performance of an industrial system.

By way of introduction, FIG. 1 illustrates an example industrial automation system 10 employed by a food manufacturer. The present embodiments described herein may be implemented using the various devices illustrated in the industrial automation system 10 described below. However, it should be noted that although the example industrial automation system 10 of FIG. 1 is directed at a food manufacturer, the present embodiments described herein may be employed within any suitable industry, such as automotive, mining, hydrocarbon production, manufacturing, and the like. The following brief description of the example industrial automation system 10 employed by the food manufacturer is provided herein to help facilitate a more comprehensive understanding of how the embodiments described herein may be applied to industrial devices to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials may be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may provide power to the machinery used to perform certain tasks, provide protection to the machinery from electrical surges, prevent injuries from occurring with human operators in the industrial automation system 10, monitor the operations of the respective device, communicate data regarding the respective device to a supervisory control system 40, and the like. In some embodiments, each industrial automation device 20 or a group of industrial automation devices 20 may be controlled using a local control system 42. The local control system 42 may include receive data regarding the operation of the respective industrial automation device 20, other industrial automation devices 20, user inputs, and other suitable inputs to control the operations of the respective industrial automation device(s) 20.

Figure 2:
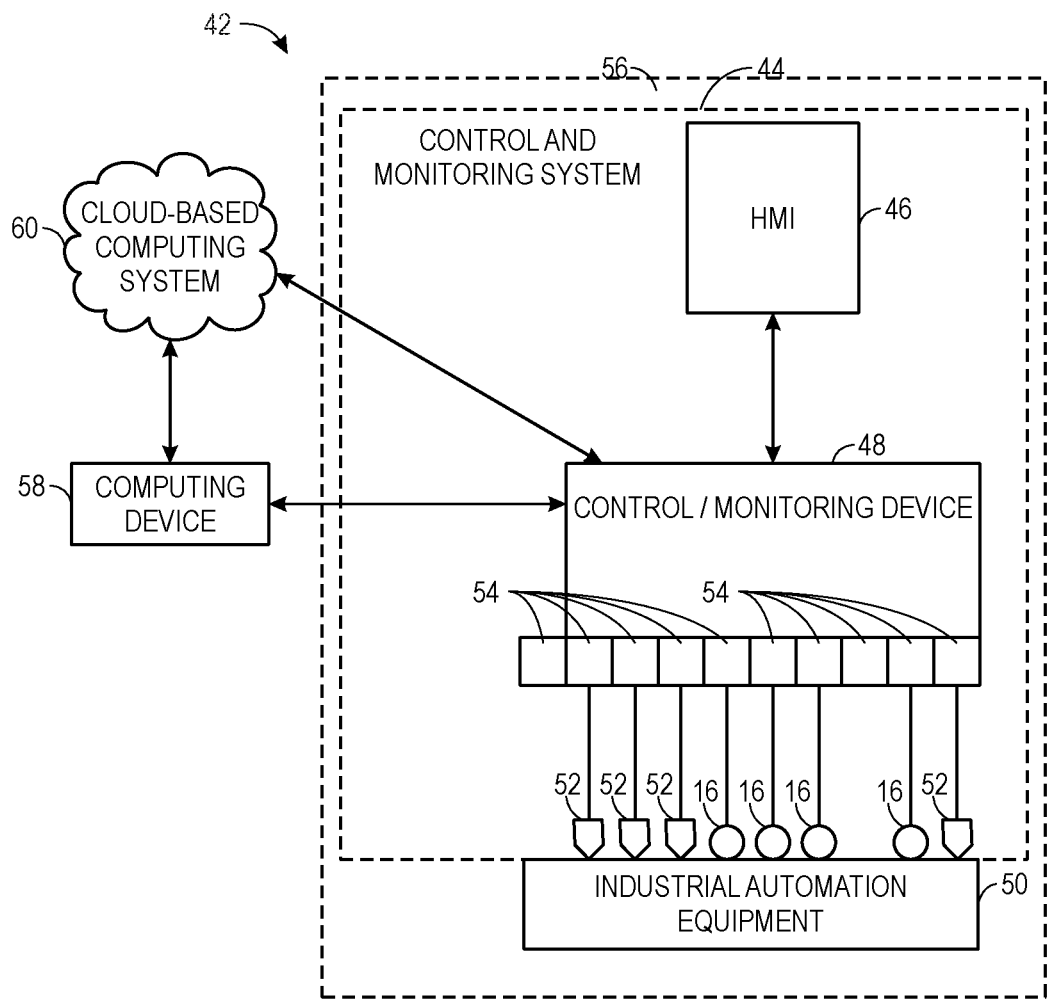
FIG. 2 illustrates a diagrammatical representation of an exemplary control and monitoring system that may be employed in any suitable industrial automation system, in accordance with an embodiment.

By way of example, FIG. 2 illustrates a diagrammatical representation of an exemplary local control system 42 that may be employed in any suitable industrial automation system 10, in accordance with embodiments presented herein. In FIG. 2, the local control system 42 is illustrated as including a human machine interface (HMI) 46 and a control/monitoring device 48 or automation controller adapted to interface with devices that may monitor and control various types of industrial automation equipment 50. By way of example, the industrial automation equipment 50 may include the mixer 18, the depositor 22, the conveyor 24, the oven 26, other pieces of machinery described in FIG. 1, or any other suitable equipment.

It should be noted that the HMI 46 and the control/monitoring device 48, in accordance with embodiments of the present techniques, may be facilitated by the use of certain network strategies. Indeed, any suitable industry standard network or network may be employed, such as DeviceNet, to enable data transfer. Such networks permit the exchange of data in accordance with a predefined protocol and may provide power for operation of networked elements.

As discussed above, the industrial automation equipment 50 may take many forms and include devices for accomplishing many different and varied purposes. For example, the industrial automation equipment 50 may include machinery used to perform various operations in a compressor station, an oil refinery, a batch operation for making food items, a mechanized assembly line, and so forth. Accordingly, the industrial automation equipment 50 may comprise a variety of operational components, such as electric motors, valves, actuators, temperature elements, pressure sensors, or a myriad of machinery or devices used for manufacturing, processing, material handling, and other applications.

Additionally, the industrial automation equipment 50 may include various types of equipment that may be used to perform the various operations that may be part of an industrial application. For instance, the industrial automation equipment 50 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 50 may be made up of certain automation devices 20, which may include controllers, input/output (I/O) modules, motor control centers, motors, human machine interfaces (HMIs), operator interfaces, contactors, starters, sensors 16, actuators, drives, relays, protection devices, switchgear, compressors, firewall, network switches (e.g., Ethernet switches, modular-managed, fixed-managed, service-router, industrial, unmanaged, etc.), and the like.

In certain embodiments, one or more properties of the industrial automation equipment 50 may be monitored and controlled by certain equipment for regulating control variables used to operate the industrial automation equipment 50. For example, the sensors 16 may monitor various properties of the industrial automation equipment 50 and may provide data to the local control system 42, which may adjust operations of the industrial automation equipment 50, respectively. For example, the local control system 42, the control/monitoring device 48, or another suitable control system, may actuate one or more actuators 52.

In some cases, the industrial automation equipment 50 may be associated with devices used by other equipment. For instance, scanners, gauges, valves, flow meters, and the like may be disposed on industrial automation equipment 50. Here, the industrial automation equipment 50 may receive data from the associated devices and use the data to perform their respective operations more efficiently. For example, a controller (e.g., control/monitoring device 48) of a motor drive may receive data regarding a temperature of a connected motor and may adjust operations of the motor drive based on the data.

In certain embodiments, the industrial automation equipment 50 may include a communication component that enables the industrial equipment 50 to communicate data between each other and other devices. The communication component may include a network interface that may enable the industrial automation equipment 50 to communicate via various protocols such as Ethernet/IP®, ControlNet®, DeviceNet®, or any other industrial communication network protocol. Alternatively, the communication component may enable the industrial automation equipment 50 to communicate via various wired or wireless communication protocols, such as Wi-Fi, mobile telecommunications technology (e.g., 2G, 3G, 4G, 5G, LTE), Bluetooth®, near-field communications technology, and the like.

The sensors 16 may be any number of devices adapted to provide information regarding process conditions. The actuators 52 may include any number of devices adapted to perform a mechanical action in response to a signal from a controller (e.g., the control/monitoring device 48). The sensors 16 and actuators 52 may be utilized to operate the industrial automation equipment 50. Indeed, they may be utilized within process loops that are monitored and controlled by the control/monitoring device 48 and/or the HMI 46. Such a process loop may be activated based on process input data (e.g., input from a sensor 16) or direct operator input received through the HMI 46. As illustrated, the sensors 16 and actuators 52 are in communication with the control/monitoring device 48. Further, the sensors 16 and actuators 52 may be assigned a particular address in the control/monitoring device 48 and receive power from the control/monitoring device 48 or attached modules.

Input/output (I/O) modules 54 may be added or removed from the control and monitoring system 44 (e.g., control/monitoring system 44) via expansion slots, bays or other suitable mechanisms. In certain embodiments, the I/O modules 54 may be included to add functionality to the control/monitoring device 48, or to accommodate additional process features. For instance, the I/O modules 54 may communicate with new sensors 16 or actuators 52 added to monitor and control the industrial automation equipment 50. It should be noted that the I/O modules 54 may communicate directly to sensors 16 or actuators 52 through hardwired connections or may communicate through wired or wireless sensor networks, such as Hart or IOLink.

Generally, the I/O modules 54 serve as an electrical interface to the control/monitoring device 48 and may be located proximate or remote from the control/monitoring device 48, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE702.3, TCP/IP, UDP, Ethernet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 54 may transfer input and output signals between the control/monitoring device 48 and the industrial automation equipment 50. As illustrated, the sensors 16 and actuators 52 may communicate with the control/monitoring device 48 via one or more of the I/O modules 54 coupled to the control/monitoring device 48.

In certain embodiments, the control/monitoring system 44 (e.g., the HMI 46, the control/monitoring device 48, the sensors 16, the actuators 52, the I/O modules 54) and the industrial automation equipment 50 may make up an industrial automation application 56. The industrial automation application 56 may involve any type of industrial process or system used to manufacture, produce, process, or package various types of items. For example, the industrial applications 56 may include industries such as material handling, packaging industries, manufacturing, processing, batch processing, the example industrial automation system 10 of FIG. 1, and the like.

The control/monitoring device 48 may be communicatively coupled to a computing device 58 and a cloud-based computing system 60. In this network, input and output signals generated from the control/monitoring device 48 may be communicated between the computing device 58 and the cloud-based computing system 60. Although the control/monitoring device 48 may be capable of communicating with the computing device 58 and the cloud-based computing system 60, as mentioned above, in certain embodiments, the control/monitoring device 48 (e.g., local computing system 42) may perform certain operations and analysis without sending data to the computing device 58 or the cloud-based computing system 60.

Figure 3:
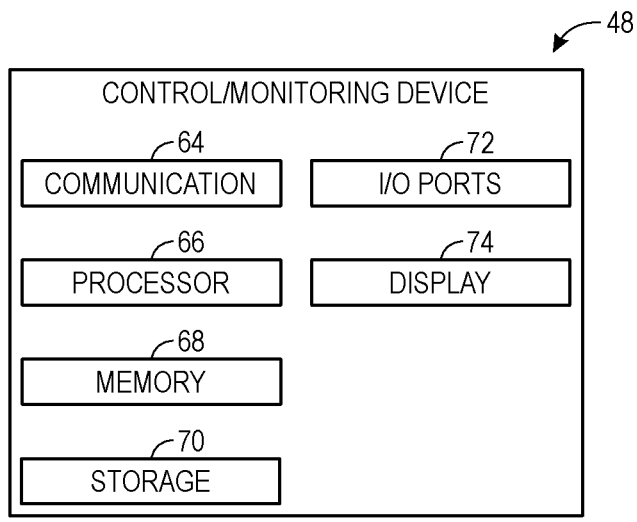
FIG. 3 illustrates example components that may be part of a control/monitoring device that may be implemented in the industrial automation system, in accordance with an embodiment.

FIG. 3 illustrates example components that may be part of the control/monitoring device 48 or any other suitable computing device that implement embodiments presented herein. For example, the control/monitoring device 48 may include a communication component 64 (e.g., communication circuitry), a processor 66, a memory 68, a storage 70, input/output (I/O) ports 72, a sensor 16 (e.g., an electronic data sensor, a temperature sensor, a vibration sensor, a camera), a display 74, and the like. The communication component 64 may be a wireless or wired communication component that may facilitate communication between the control/monitoring device 48, the local control system 42, and other communication capable devices.

The processor 66 may be any type of computer processor or microprocessor capable of executing computer-executable code. The processor 66 may also include multiple processors that may perform the operations described below. The memory 68 and the storage 70 may be any suitable articles of manufacture that can serve as media to store processor-executable code, data, or the like. These articles of manufacture may represent computer-readable media (e.g., any suitable form of memory or storage) that may store the processor-executable code used by the processor 66 to perform the presently disclosed techniques. Generally, the processor 66 may execute software applications that include identifying anomalies in sensor data measured by the sensor 16, identifying a frequency corresponding to a change in the sensor data, determining a reduced set of sensor data, and generating constraints used to validate the sensor data, as discussed in more detail with respect to FIG. 6.

The memory 68 and the storage 70 may also be used to store the data, analysis of the data, the software applications, and the like. For example, the memory 68 and the storage 70 may store instructions associated with implementing different levels of processing for various operations. As another non-limiting example, the memory 68 and the storage 70 may store one or more previously acquired sensor data (e.g., by the sensor 16) or streamed sensor data. As another non-limiting example, the memory 68 and the storage 70 may store a constraint that represents a relationship between sensor data acquired by the sensor 16 and streamed sensor data from one or more additional sensors. The memory 68 and the storage 70 may represent non-transitory computer-readable media (e.g., any suitable form of memory or storage) that may store the processor-executable code used by the processor 66 to perform various techniques described herein. It should be noted that non-transitory merely indicates that the media is tangible and not a signal.

The I/O ports 72 may be interfaces that may couple to other peripheral components such as input devices (e.g., keyboard, mouse), sensors, input/output (I/O) modules, and the like. The I/O modules may enable the control/monitoring device 48 to communicate with the computing device 58, the control/monitoring device 48, the industrial automation equipment 50, or other devices in the industrial automation system via the I/O modules.

The display 74 may depict visualizations associated with software or executable code being processed by the processor 66. In one embodiment, the display 74 may be a touch display capable of receiving inputs (e.g., parameter data for operating the industrial automation equipment 50) from a user of the control/monitoring device 48, such as an indication indicating that the motion profile of an industrial automation equipment 50. As such, the display 74 may serve as a user interface to communicate with control/monitoring device 48. The display 74 may display a graphical user interface (GUI) for operating the control/monitoring device 48, for tracking the maintenance of the industrial automation equipment 50, and the like. The display 74 may be any suitable type of display, such as a liquid crystal display (LCD), plasma display, or an organic light emitting diode (OLED) display, for example. Additionally, in one embodiment, the display 74 may be provided in conjunction with a touch-sensitive mechanism (e.g., a touch screen) that may function as part of a control interface for the control/monitoring device 48 or for a number of pieces of industrial automation equipment in the industrial automation application 56, to control the general operations of the industrial automation application 56.

Although the components described above have been discussed with regard to the control/monitoring device 48 and the local control system 42, it should be noted that similar components may make up other computing devices described herein. Further, it should be noted that the listed components are provided as example components and the embodiments described herein are not to be limited to the components described with reference to FIG. 3. For example, the control/monitoring device 48 and the local control system 42 may include the communication component 64, the processor 66, the memory 68, the storage 70, the I/O ports 72, and the display 74. However, in general, the processor 66 of the control/monitoring device 48 may be capable of processing relatively more data than the processor 66 of the control/monitoring device 48. For example, the processor 66 of the control/monitoring device 48 may be capable of batch processing, while the processor 66 of the control/monitoring device 48 may be capable of processing streamed sensor data.

Keeping the foregoing in mind, in some embodiments, the memory 68 and/or storage 70 of the computing device 58 may include a software application that may be executed by the processor 66 and may be used to monitor, control, access, or view one of the industrial automation equipment 50. As such, the computing device 58 may communicatively couple to industrial automation equipment 50 or to a respective computing device of the industrial automation equipment 50 via a direct connection between the devices or via the cloud-based computing system 60. The software application may perform various functionalities, such as track statistics of the industrial automation equipment 50, store reasons for placing the industrial automation equipment 50 offline, determine reasons for placing the industrial automation equipment 50 offline, secure industrial automation equipment 50 that is offline, deny access to place an offline industrial automation equipment 50 back online until certain conditions are met, and so forth.

As another non-limiting example, and referring back to FIG. 2, in operation, the industrial automation application 56 may receive one or more process inputs to produce one or more process outputs. For example, the process inputs may include feedstock, electrical energy, fuel, parts, assemblies, sub-assemblies, operational parameters (e.g., sensor measurements), or any combination thereof. Additionally, the process outputs may include finished products, semi-finished products, assemblies, manufacturing products, by products, or any combination thereof.

To produce the processed outputs, the control/monitoring device 48 may output control signals to instruct industrial automation equipment 50 to perform one or more control actions. For example, the control/monitoring device 48 may instruct a motor (e.g., an automation device 20) to implement a control action to cause the motor to operate at a particular operating speed (e.g., a manipulated variable set point).

In some embodiments, the control/monitoring device 48 may determine the manipulated variable set points based at least in part on process data. As described above, the process data may be indicative of operation of the industrial automation device 20, the industrial automation equipment 50, the industrial automation application 56, and the like. As such, the process data may include operational parameters of the industrial automation device 20 and/or operational parameters of the industrial automation application 56. For example, the operational parameters may include any suitable type of measurement or control setting related to operating respective equipment, such as temperature, flow rate, electrical power, and the like.

Thus, the control/monitoring device 48 may receive process data from one or more of the industrial automation devices 20, the sensors 16, or the like. In some embodiments, the control/monitoring device 48 may determine an operational parameter and communicate a measurement signal indicating the operational parameter to the control/monitoring device 48 when the operational parameter is above a threshold (e.g., indicating an anomaly or a maintenance condition), in accordance with a frequency of the operational parameter occurring (e.g., as discussed in more detail with respect to FIG. 6), and the like. For example, a temperature sensor may measure a temperature of a motor (e.g., an automation device 20) and transmit a measurement signal indicating the measured temperature to the control/monitoring device 48. The control/monitoring device 48 may then analyze process data associated with the operation of the motor to monitor performance of an associated industrial automation application 56 (e.g., determine an expected operational state) and/or perform diagnostics on the industrial automation application 56 based on the measured temperature.

To facilitate controlling operation and/or performing other functions, the control/monitoring device 48 may include one or more controllers, such as one or more model predictive control (MPC) controllers, one or more proportional-integral-derivative (PID) controllers, one or more neural network controllers, one or more fuzzy logic controllers, and other suitable controllers.

In some embodiments, the supervisory control system 40 may provide centralized control over operation of the industrial automation application 56. For example, the supervisory control system 40 may enable centralized communication with a user (e.g., operator). To facilitate, the supervisory control system 40 may include the display 74 to provide information to the user. For example, the display 74 may present visual representations of information, such as process data, selected features, expected operational parameters, and/or relationships there between. Additionally, the supervisory control system 40 may include similar components as the control/monitoring device 48 described above in FIG. 3.

On the other hand, the control/monitoring device 48 may provide localized control over a portion of the industrial automation application 56. For example, in the depicted embodiment of FIG. 1, the local control system 42 that may be part of the mixer 18 may include the control/monitoring device 48, which may provide control over operation of a first automation device 20 that controls the mixer 18, while a second local control system 42 may provide control over operation of a second automation device 20 that controls the operation of the depositor 22.

In some embodiments, the local control system 42 may control operation of a portion of the industrial automation application 56 based at least in part on the control strategy determined by the supervisory control system 40. Additionally, the supervisory control system 40 may determine the control strategy based at least in part on process data determined by the local control system 42. Thus, to implement the control strategy, the supervisory control system 40 and the local control systems 42 may be communicatively coupled via a network, which may be any suitable type, such as an Ethernet/IP network, a ControlNet network, a DeviceNet network, a Data Highway Plus network, a Remote I/O network, a Foundation Fieldbus network, a Serial, DH-485 network, a SynchLink network, or any combination thereof.

Figure 4:
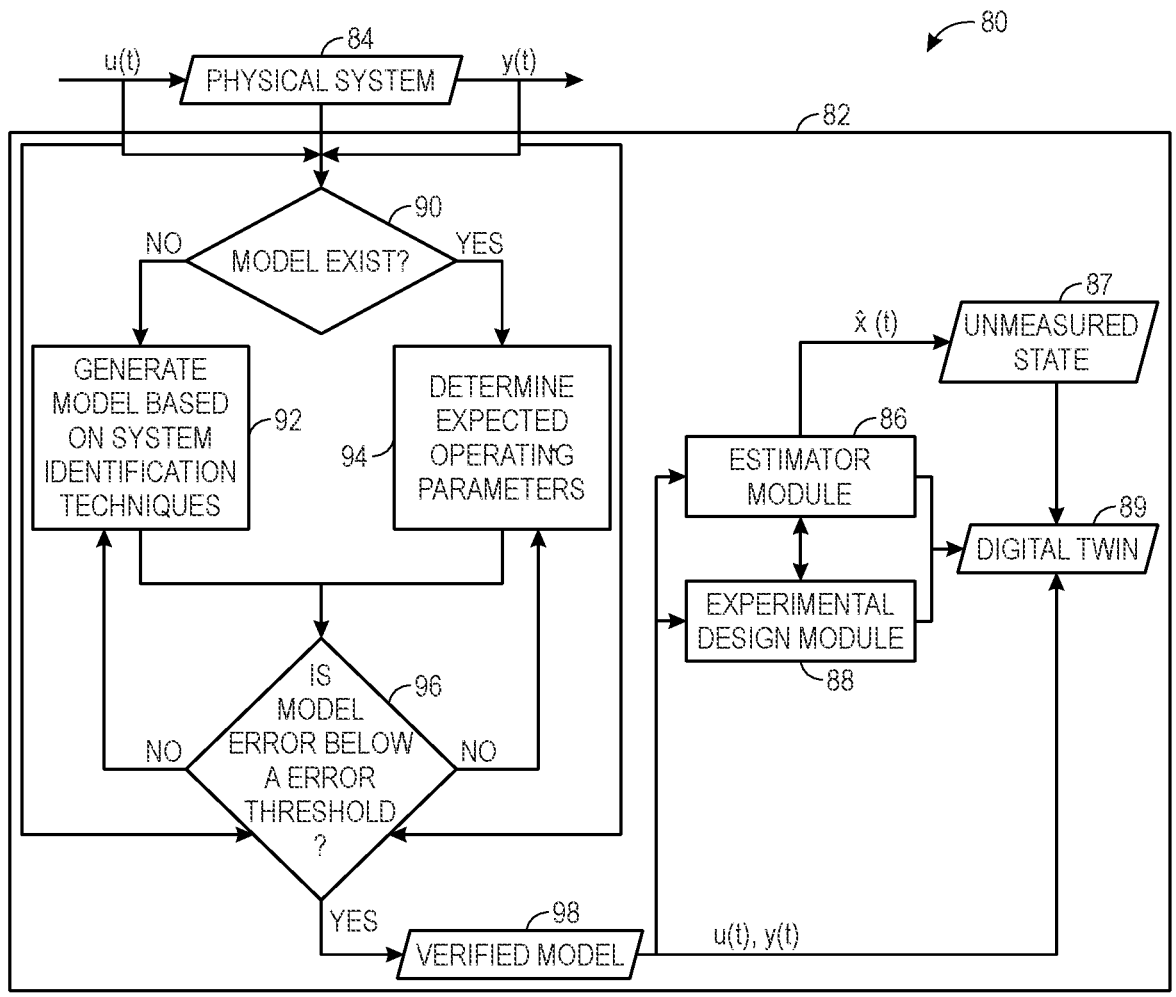
FIG. 4 illustrates components of a digital twin control system that may be implemented in the control/monitoring device, in accordance with an embodiment.

With the foregoing in mind, FIG. 4 is a block diagram 80 of a digital twin control system 82 used to control operations for a physical system 84. In general, the digital twin control system 82 is generated using input and output signals by employing system identification and parameter estimation couple with modern control theory and applied statistics to automatically create and refine a system observer for online feedback control and offline design of experiments. Additionally, the digital twin may be capable of selecting control gains for a user based on control theory, thereby reducing or minimizing how much control theory input should be provided by the user. Further, the digital twin may be capable of generating bounded reference inputs (e.g., bounded-inputs) that the feedback control system can utilize within an error threshold.

In some embodiments, the digital twin control system 82 may be a software application having instructions executable by a processor to generate the model used to control one or more industrial automation components of the industrial automation system 10 based on received process inputs (e.g., u(t)) and process outputs (e.g., y(t)) related to a physical system 84. For example, the digital twin control system 82 may be implemented by the processor 66 of the control/monitoring device 48 and/or stored in the memory 68 of the control/monitoring device 48.

In some embodiments, the process inputs and/or process outputs may be used by the digital twin control system 82 to estimate operating states of the one or more industrial automation components and/or the industrial automation system 10. In some embodiments, the process inputs and/or process outputs may be used by the digital twin control system 82 to determine how certain changes of one or more parameters of the industrial automation components may affect operation of the one or more industrial automation components (i.e., experimental design). In some embodiments, and as discussed in further detail below, the model may be used in an estimator module 86 (e.g., observer module) and/or an experimental design module 88 to perform such operations as described herein.

Turning back to FIG. 4, at decision block 90, the digital twin control system 82 receives information or data associated with a physical system 84. In some embodiments, the physical system 84 may include information (e.g., data) related to one or more industrial automation components of the industrial automation system 10. For example, the physical system 84 may provide data related to the depositor 22, the conveyor 24, the oven 26, tray loader 30, or a combination thereof. Further, at least in some instances, the physical system 84 may correspond to a particular subcomponent of the industrial automation system, such as a particular wheel of the conveyor 24, a door of the oven 26, an actuator of the depositor 22, and the like. In any case, the physical system 84 may correspond to a particular industrial automation system that performs certain tasks related to manufacturing, processing, or the like. Moreover, the physical system 84 may include data (e.g., process inputs u(t) and process outputs y(t)) that characterizes how each component within the particular industrial automation system operates. That is, each component may receive inputs u(t) (e.g., power, voltage, current, speed, operating parameters) and produce outputs y(t) (e.g., power, voltage, speed, torque, visualizations). Each component of the physical system 84 may interact with each other based on their connections, relative positions between each other, and the like. In some embodiments, each component of the physical system 84 or the entire physical system 84 itself may be represented by a model (e.g., simulation model) that characterizes how the respective component operates (e.g., produce outputs y(t)) given certain input u(t). After receiving the data related to the physical system 84, at block 90, the digital twin control system 82 determines whether a model exists for the physical system 84, components of the physical system 84, or both. If the digital twin control system 82 determines that a model for the physical system 84 does not exist, then the digital twin control system 82 may generate a model based on system identification techniques at block 92.

In general, system identification techniques include identifying statistical methods to the model (e.g., a mathematical model) based on measured data (e.g., the process inputs and the process outputs). In some embodiments, the statistical methods may be collected over time based on input data and output data monitored for various components. That is, as various input parameters change for a particular component, the effects to the output parameters may be tracked. The statistical methods may then include identifying correlations between the changes in input parameters or external parameters (e.g., ambient conditions, separate sensor data unrelated to the component) to the output parameters.

Referring back to block 90, if the digital twin control system 82 determines that a model does exist, the digital twin control system 82 may proceed to block 94 and determine expected operating parameters of the components or the physical system based on parameter estimation techniques at block 94. In general, parameter estimation techniques may include data processing techniques such as probability plotting, rank regression, least squares, maximum likelihood estimation, and/or Bayesian estimation methods. That is, based on the model that characterizes the expected operations of the respective component, the digital twin control system 82 may use the data processing techniques to determine the expected operations for any particular component based on the input data u(t) for the respective component and the respective model.

After generating the model at block 92 or determining the expected parameters at block 94, the digital twin control system 82 may verify, at block 96, that the estimated parameters or the identified model are within a threshold error range or below a threshold error value. If the digital twin control system 82 determines that the estimated parameters or the identified model are within the threshold error range or below the threshold error value, digital twin control system 82 may output a verified model 98. The verified model 98 corresponds to a simulation or simulated model of the physical system 84 based on the model generated at block 92 and/or the expected parameters determined at block 94.

At least in some instances, the digital twin control system 82 may utilize a computing module for generating the verified model 98 (i.e., a computing module separate from the estimator module and the experimental design module). In general, the computing module may correspond to any suitable set of software instructions, code, or component that performs a particular task or set of tasks, such as generate the verified model 98. In general, the digital twin control system 82 may utilize the verified model 98 to generate a state estimator by the estimator module 86, as described in more detail with respect to FIG. 6. Additionally, the digital twin control system 82 may include an experimental design module that determines effects resulting from changes to certain operating parameters and modifies operation of an industrial process based on the changes.

At block 96, the digital twin control system 82 may determine whether an error or discrepancy associated with the model is below an error threshold (e.g., less than 1%, less than 2%, less than 5%, less than 10%, less than 20%) or threshold range (e.g., between 0-1%, between 0-2%, between 0-5%, between 0-10%). At least in some instances, the digital twin control system 82 may continue to receive process inputs u(t) and process outputs y(t) and compare them to the respective models at block 96. That is, the digital twin control system 82 may detect a change in the physical system 84 or components of the physical system 84 and the respective model. For example, after generating the model, the digital twin control system 82 may receive subsequent process inputs u(t) and process outputs y(t) associated with an industrial automation system 10 via sensor data, data output by various control system, and the like. The digital twin control system 82 may then determine whether a discrepancy exists between the updated process inputs u(t) and process outputs y(t) and predicted outputs of the model. In some embodiments, the digital twin control system 82 may compare the discrepancy to a threshold range. If the discrepancy falls outside of the threshold range, the digital twin control system 82 may determine that an anomaly is present within the system (e.g., an equipment or software is not operating as expected). As such, the digital twin control system 82 may send a notification to a controller or control system (i.e., a controller having memory storing instructions for performing the operations of the digital twin control system 82) that may output a control signal that halts operation of one or more components of the physical system 84, modifies an operating parameter of the one or more components of the physical system 84, causes an alert to be displayed on a computing device of a user or operator, or the like.

If the digital twin control system 82 determines that the discrepancies do not fall outside of the threshold range, the digital twin control system 82 may generate the verified model 98 that may be used to perform certain operations to control operation of the industrial automation system 10, such as determining control actions based on the estimator module 86 and/or experimental design module 88.

As shown in the illustrated embodiment, the estimator module 86 may utilize the verified model 98 and an estimator module 86 to determine unmeasured operating states 87, unmeasured operating values, or the like. As described herein, unmeasured operating parameters, unmeasured operating values, or unmeasured operating states may include a parameter (e.g., a temperature) that is outside of a range for certain sensors to measure, a parameter of an area or equipment may be inaccessible by a sensor, or any suitable measurement or parameter that may not be directly measured or acquired from sensors or control systems within the physical system 84.

Figure 5:
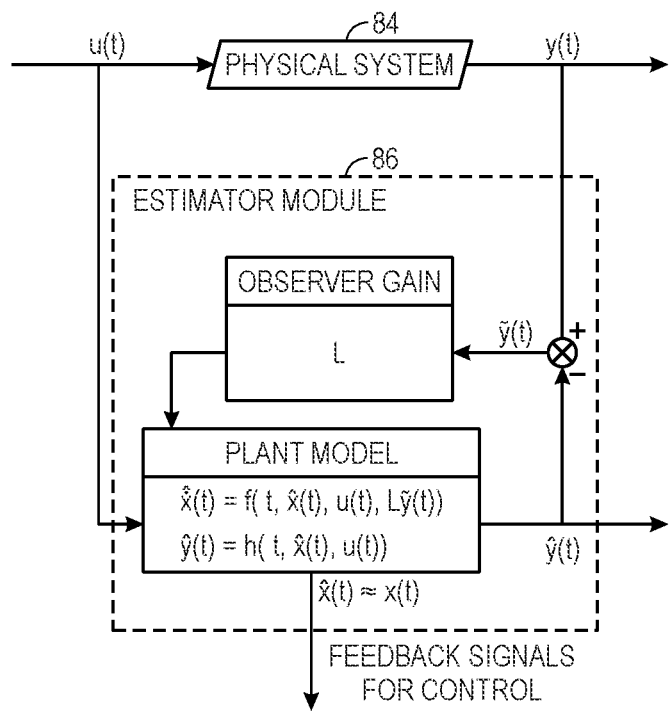
FIG. 5 is a block diagram of an estimator module that receives process inputs and outputs associated with a physical system, in accordance with an embodiment.

With the foregoing in mind, using the verified model 98, different process inputs u(t) may be evaluated to determine an estimated process output $\hat{y}(t)$. To illustrate this, FIG. 5 shows a block diagram of the estimator module 86 generating the estimated process output $\hat{y}(t)$. As shown, the estimated process output $\hat{y}(t)$ from the physical system 84 may be provided to the estimator module 86, which may use a state estimator, L, to determine an estimated process input $\hat{x}(t)$ from the physical system 84, an estimated process output $\hat{y}(t)$, or both. The estimated process input $\overline{x}(t)$, the estimated process output $\hat{y}(t)$, or both may correspond to an unmeasured state. For example, the estimator module 86 may determine the estimated process input $\hat{x}(t)$ using the process input u(t) and the state estimator L, which may characterize a relationship between various measured parameters and the estimated values. For example, the estimator module 86 may utilize a first equation (e.g., $\hat{x}(t)=f(t, \hat{x}(t), u(t), L\tilde{y}(t)))$ relating the change in the estimated process input $\hat{x}(t)$, process input u(t), the state estimator L, and the discrepancy $\tilde{y}(t)$, and time t to the change in the estimated process input as a function of time $\hat{x}(t)$. Further, the estimator module 86 may utilize a second equation (e.g., $\hat{y}(t)=h(t, \hat{x}(t), u(t))$ relating the process input u(t), time t, and the estimated process input $\hat{x}(t)$ to the estimated process output $\hat{y}(t)$. At least in some instances, the verified model 98 may be analyzed in parallel with this process performed by the estimator module 86, which may cause the outputs of the verified model 98 and the estimator module 86 to converge more quickly.

As illustrated, the estimator module 86 may also be used to generate the digital twin 89, which may digitally mimic the operations (e.g., process outputs y(t)) of the physical system 84. Further, the digital twin 89 may receive the process inputs u(t), the process output y(t), and the unmeasured operating states $\hat{x}(t)$ from the verified model 98, the estimator module 86, and the like. In general, the digital twin 89 is a modified model of the verified model 98 that may determine unmeasured operating states, parameters, and values. Accordingly, the digital twin 89 may be utilized by the control/monitoring device 48 to adjust and/or modify operation of the industrial automation components or equipment 50 in accordance with the digital twin 89. At least in some instances, the digital twin 89 may be capable of receiving inputs and displaying outputs via graphic user interface. For example, the digital twin 89 may receive requested operating parameters via the interface and the digital twin 89 may output an expected adjustment to operation of the industrial automation component based on the requested operating parameters. This is generally described in more detail with respect to FIG. 8.

Figure 6:
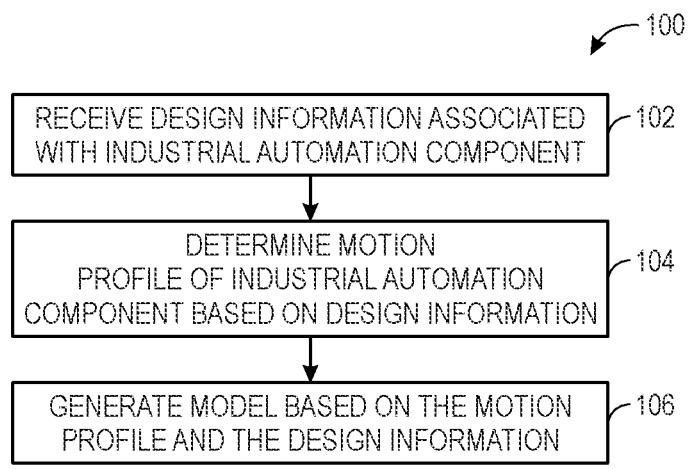
FIG. 6 a flow diagram of an embodiment for generating a model representative of one or more industrial automation components based on design information and a motion profile of the one or more industrial automation components, in accordance with an embodiment.

Keeping the foregoing in mind and referring back to block 92 of FIG. 4, the digital twin control system 82 may identify a model (i.e., the digital twin control system 82 may determine a model exists for one or more industrial automation components at block 90) used to control an industrial process based on the received and/or measured process inputs and outputs in accordance with a method 100 illustrated in FIG. 6. By way of example, the digital twin control system 82 may generate the model based on design information and/or motion information associated with a physical system. In general, the method 100 may be performed by a processor or suitable computer device capable of communicating with other components in an industrial automation system may perform the disclosed method 100 including, but not limited to, a cloud-based computing system, a computing device, and the like. In some embodiments, the steps of method 100 may be performed by the processor 66 of the control/monitoring device 48.

Before continuing, it should be noted that the method 100 described below corresponds to an example model for components of the physical system 84 or the physical system 84 that performs some motion operation. However, it should be understood, that the method 100 may be implemented for a variety of components of the physical system 84 or a variety of types of the physical system 84.

Referring now to FIG. 6, at block 102, the digital twin control system 82 may receive design information associated with one or more industrial automation components, equipment, machines, and the like associated with the physical system 84. In general, the design information may indicate physical parameters of the components, equipment, machines, and the like. For example, the design information may include a computer-aided design (CAD) file or other documentation including information such as dimensions of one or more subcomponents of an industrial automation components 50 (e.g., a diameter of a wheel of a conveyor belt, interior or exterior dimensions of an oven, and the like), a material type of the component (e.g., a type of thermoplastics, metal, rubber, fabric and/or leather of the belt of the conveyor), operational parameters (e.g., input output parameters, correlations), and the like.

At block 104, the digital twin control system 82 may determine motion information that describes expected motions performed by components of the physical system 84 based on the received design information. In general, the motion information may indicate a type of motion performed by the one or more industrial automation components 50 represented by the design information. For example, the motion information may indicate that the industrial automation equipment 50 undergoes linear motion, rotational motion, or both.

At block 106, digital twin control system 82 generates a model based on the motion profile and the design information. In some embodiments, the generated model may be further optimized via verification of the model over time, as generally described with respect to block 92 of FIG. 4. In some embodiments, the generated model may be the verified model 98 and utilized to generate the state estimator L for the estimator module 86. The state estimator L may also be used to determine the viability of various experimental designs via an experimental design module 88, as further described with respect to FIG. 4.

In some embodiments, the digital twin control system 82 may determine electrical parameters, thermodynamic parameters, mechanical parameters, or other parameters associated with the industrial automation equipment 50 represented by the design information. In some embodiments, the electrical parameters may include an alternating current (AC) or direct current (DC) output voltage of the industrial automation equipment 50, an output current of the industrial automation equipment 50, a power factor, and other values associated with the industrial automation equipment 50 (e.g., drives and/or motors) used to perform operations represented by the physical system 84.

In some embodiments, the mechanical parameters may include a moment of inertia of a drive, a motor torque constant, physical dimensions of the motor, and the like associated with the motor used to control the industrial automation equipment 50 represented by the design information. In some embodiments, the thermodynamic parameters may include an efficiency of a motor (e.g., a percentage of electrical energy converted into mechanical energy), thermal resistance of materials of the motor and/or the drive, and the like. Accordingly, using such parameters (i.e., the electrical parameters, the thermodynamic parameters, the mechanical parameters, or a combination thereof), the digital twin control system 82 may generate a model that accounts for various potential boundaries (e.g., a maximum power output by a motor) of the industrial automation equipment 50. That is, such parameters may be utilized for determining unmeasured operating states (e.g., $\hat{x}(t)$) and, further, how physical modifications, electrical modifications, and/or thermal modifications may affect performance of one or more industrial automation components 50.

Accordingly, the process 100 enables generation of a model that represents both the physical components of an industrial automation equipment 50 and how the physical components of the industrial automation equipment 50 may operate via the motion profile. In this way, the process 100 may enable users to utilize models based on existing design information (e.g., CAD files).

Figure 7:
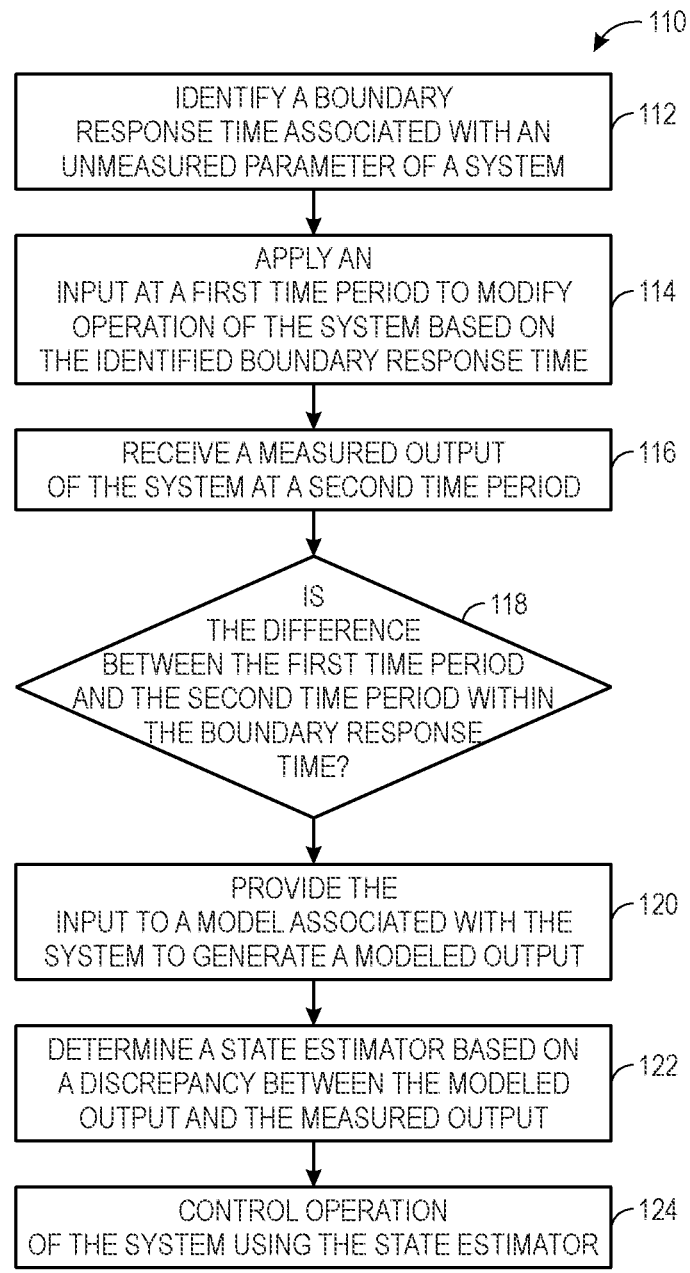
FIG. 7 is a flow diagram of an embodiment for generating a state estimator that may be implemented in the control/monitoring device, in accordance with an embodiment.

Referring back to FIG. 4, the digital twin control system 82 may utilize the generated model (e.g., the verified model 98) to generate a state estimator L to be utilized by the estimator module 86. As described above, the state estimator L is generally an operator that may be utilized in conjunction with the verified model 98 to determine unmeasured operating states, values, or parameters. That is, the state estimator L is an operator capable of adjusting a predicted output to match a measured process output based on unmeasured states that are previously not account for by the model. To illustrate this, FIG. 7 illustrates a flow chart of a method 110 for generating a state estimator L. In general, the method 110 may be performed by a processor (e.g., the processor 66) or suitable computer device capable of communicating with other components in an industrial automation system may perform the disclosed method 110 including, but not limited to, a cloud-based computing system, a computing device, and the like. In some embodiments, the steps of method 110 may be performed by the estimator module 86.

With this in mind, and referring now to FIG. 7, at block 112, a digital twin control system 82 may identify a boundary response time associated with an unmeasured operating parameters or states of an industrial system. In general, the boundary response time (e.g., boundary response time threshold) corresponds to a maximum and/or minimum response value for which a system is capable of producing a response. For example, the boundary response time may correspond to a maximum frequency at which two or more devices are capable of communicating. By way of example, unmeasured operating parameters or states may include a temperature that is outside of a range for certain temperature sensors or a parameter of an area or equipment may be inaccessible or unmeasured by a sensor. In some embodiments, the processor may identify a maximum transient response of the system, such as an electrical signal, and use the maximum transient response of the system as the boundary response time threshold. At least in some instances, the processor may determine whether the maximum transient response is even capable of being measured. In any case, the processor may use a fraction of the maximum transient response as the boundary response time threshold (e.g., less than 60%, less than 50%, less than 40%, less than 30%, or less than 25%). In some embodiments, to identifying the boundary response time threshold, the processor may perform response tests, such as step tests or frequency tests.

After identifying the boundary response time threshold, the digital twin control system 82, at block 114, may apply an input to a first time period to modify operation of the industrial system based on the identified boundary response time threshold. For example, provide a process input to the model, using a model of the industrial automation system, in accordance with the maximum response to generate the observer gain.

Subsequent to applying the input at the first time period, the digital twin control system 82, at block 116, may receive a measured output of the industrial automation system at a second time period. At block 118, the digital twin control system 82 may compare the second time period associated with the measured output to the first time period and determine whether a difference between the second time period and the first time period is within the boundary response time threshold. If the difference is within the boundary response time threshold, the process 110 may proceed to block 120. At block 120, the digital twin control system 82 provides the input to a model associated with the system, such as the verified model 98 described above with respect to FIG. 1. The model, in turn, generates a predicted output (t). At block 122, the digital twin control system 82 generates a state estimator L based on a discrepancy between the predicted output and an actual output of the industrial process. In the general, the state estimator is an operator that, when applied to the predicted output, modifies the predicted output to be approximately equal to the actual output. At block 124, the digital twin control system 82 may modify operation of the industrial automation system based on the state estimator L. In this way, the digital twin control system 82 may utilize the verified model 98 and the estimator to control operation of the industrial process, thereby improving the accuracy of the control of the industrial process even when certain states are unmeasurable or not currently being measured.

As mentioned above, the digital twin control system 82 may also include an experimental design module 88. In general, the experimental design module 88 may be used by the digital twin control system 82 to plan, conduct, analyze, and interpret controlled tests to evaluate the factors that control the value of a parameter or group of parameters. For example, the experimental design module 88 may be used by the digital twin control system 82 to determine how physical modifications (e.g., adjusting the length of an arm of a component), electrical modifications (e.g., adjusting the power provided by a motor), thermal modifications (e.g., adding insulation to certain portions), or a combination thereof may affect the performance of the industrial automation system. It should be noted that the physical modifications, electrical modifications, and/or thermal modifications may be outside of an operating range of the model, and as such, the verified model may not be able to account for additional parameters or modifications.

Figure 8:
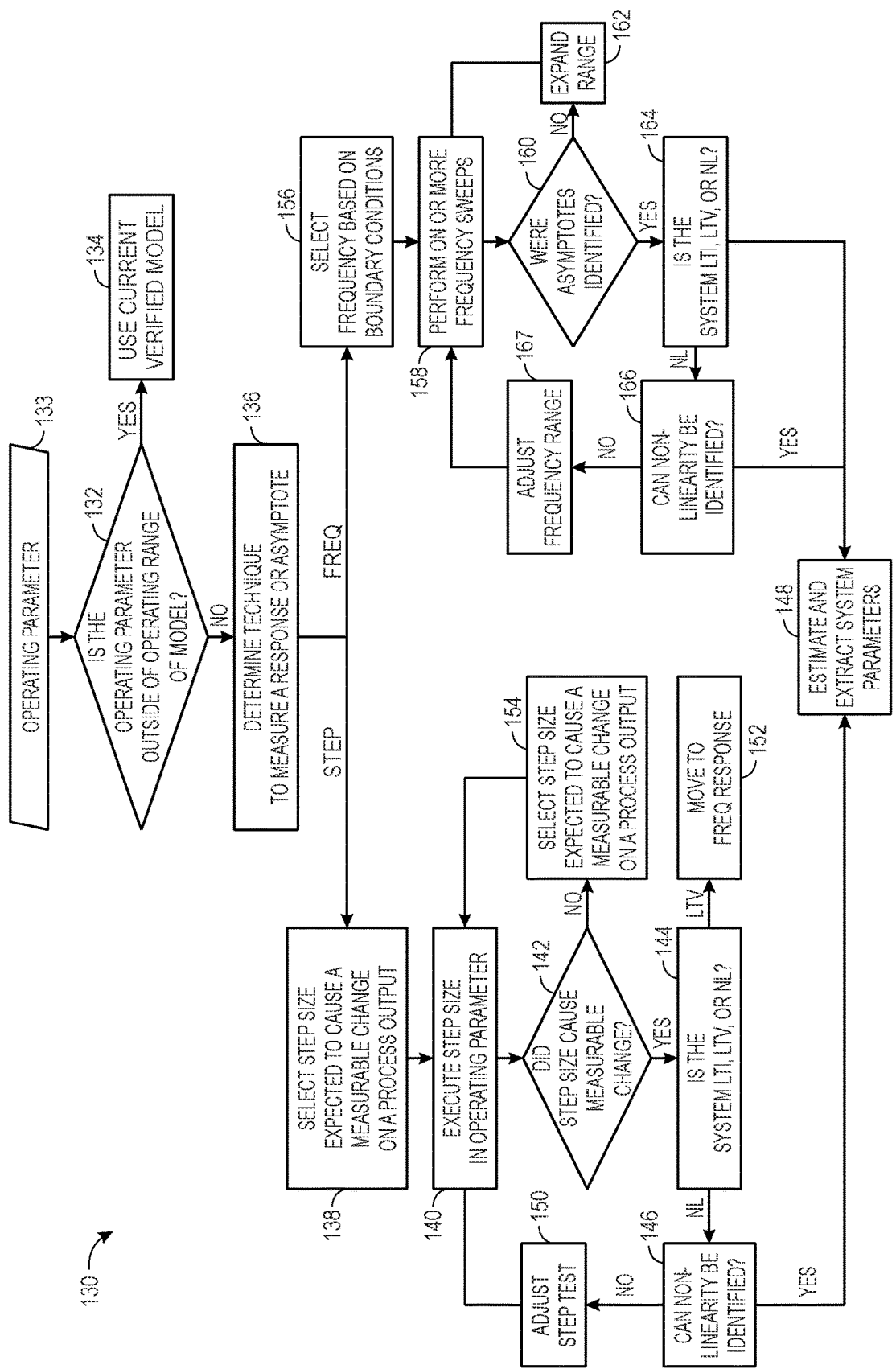
FIG. 8 is a flow diagram of an embodiment for generating an experimental design module that may be implemented in the control/monitoring device, in accordance with an embodiment.

With the foregoing in mind, FIG. 8 illustrates a flow chart of a method 130 for generating an experimental design module 88 using a model (e.g., the verified model 98 described with respect to FIG. 1). In general, the experimental design module 88 is generated using extracted parameters that relate to changes in operating parameters that result in measurable changes in the industrial process or system. Put differently, the experimental design module 88 is generated by receiving an operating parameter outside of an operating parameter range of the verified model 98, measuring a response (e.g., a measurable change in a measured process output, an asymptote in a frequency test) of an process output based on a boundary condition (e.g., a maximum or minimum operating parameter, a maximum response time threshold as described above with respect to block 112, or both); determining a time dependency and/or linear dependency associated with the operating parameter and process outputs (e.g., linear time invariant (LTI) determined by a step test and/or linear time varying (LTV) determined by a frequency response test, as described in more detail herein); and estimating system parameters (e.g., physical modifications, electrical modifications, thermal modifications, or a combination thereof) to one or more additional parameters based on the time dependency associated with the operating parameter. While the steps below are described as being performed by the digital twin control system 82, it should be understood that the steps of process 130 may be performed by any suitable computing device or processor.

At block 132, the digital twin control system 82 may determine whether a received operating parameter 133 falls within an operating range of the verified model 98. For example, the digital twin control system 82 may receive a query (e.g., via user input) indicating a modification of a physical, electrical, or thermal parameter associated with an industrial automation component. If the received operating parameter 133 is within the operating range of the verified model 98, the digital twin control system 82 may determine to use the verified model 98, at block 134. However, if the operating parameter 133 is not within the operating range of the verified model 98, the digital twin control system 82 may proceed to block 136 to generally determine a technique for determining a how response of process outputs u(t) and/or process inputs y(t) may be affected by the operating parameter 133 that is outside of the range of the verified model 98. In the illustrated embodiment, at block 136, the digital twin control system 82 may determine whether to utilize a frequency response test or a step test to determine the response of the process outputs u(t) and/or process inputs y(t) associated with the industrial automation component or the industrial automation system 10. In some embodiments, the response may be a measurable change in a process output associated with a step test and/or an asymptote identified based on a frequency test.

For example, if the digital twin control system 82, at block 136, performs a step test, the process may proceed to block 138. At block 138, may select the closest operating parameter of the verified model 98 that is expected to cause a measurable change in the process output. For example, the digital twin control system 82 may utilize a maximum or minimum operating parameter. The digital twin control system 82, at block 140, may execute a step change to the closest operating parameter selected at block 138. At block 142, the digital twin control system 82 may determine whether the step change to the closest operating parameter results in a measurable change of a process output. If the step change resulted in a measurable change of a process output, the digital twin control system 82, at block 144, may record the response (e.g., a time period between the step change and the process output). Further, the digital twin control system 82 may determine whether the system is a particular system class, such as linear time invariant (LTI) systems, linear time varying (LTV) systems, or nonlinear (NL) systems. In general, an LTI system is a system that produces an output signal from any input signal that are linear and time-invariant. An LTV system is a system that produces an output signal from any input signal that are linear and time-variant. A NL system is a system in which the output signal does not change linearly with the input signal.

If the response is NL, the process 130 may proceed to block 146. At block 146, the digital twin control system 82 may determine whether the non-linearity (e.g., a saturation, a dead-zone) can be identified. If yes, the process 130 may proceed to block 148 and estimate and extract system parameters used for generating the experimental design module 88. However, if the digital twin control system 82, at block 146, is unable to identify the nonlinearity, the process 130 may proceed to block 150 and the digital twin control system 82 may adjust the step test, such as increasing the step or decreasing the step of the operating parameter and return to block 140.

However, if at block 144, the digital twin control system 82 determines that the system is LTI, the process 130 may proceed to block 148. Alternatively, if at block 144, the digital twin control system 82 determines that the system is NL the digital twin control system 82, at block 152, may proceed to the steps associated with the frequency response test, as described in more detail below. Further, if at block 142, the digital twin control system 82 determines that the step change did not result in a measurable change of the process output, the process 130 may proceed to block 154 and select the next closet operating parameter expected to result in a measurable change.

If the digital twin control system 82 performs a frequency response test (i.e., based on a decision made at block 152 or 136), the digital twin control system 82, at block 156, may select a frequency based on boundary conditions (e.g., the boundary conditions identified at block 112 of process 110 associated with the estimator module 86). At block 158, the digital twin control system 82 may execute a frequency sweep. At block 160, the digital twin control system 82 may determine whether anomalies were identified in the frequency sweep. If no anomalies were identified, the digital twin control system 82, at block 162, may expand the range of frequencies to sweep. However, if anomalies were identified, the digital twin control system 82, at block 164, may determine whether the system is linear time invariant (LTI), linear time variant (LTV), or nonlinear (NL). If the digital twin control system 82 determines that the system is NL, the digital twin control system 82, at block 166, may determine whether the non-linearity (e.g., a saturation, a dead-zone) can be identified. If yes, the process 130 may proceed to block 148 and estimate and extract system parameters used for generating the experimental design module 88. However, if the digital twin control system 82, at block 166, is unable to identify the nonlinearity, the process 130 may proceed to block 168 and the digital twin control system 82 may adjust the frequency range, at block 167, such as expanding the frequency range, and the process may return to block 160. However, if the digital twin control system 82 determines that the system is LTI or LTV, the process 130 may proceed to block 148 and the digital twin control system 82 may estimate and extract system parameters used for generating the experimental design module 88. In general, the estimated and extracted system parameters may be utilized by a controller to determine how changes in operating parameters may affect operation of an industrial system. For example, the experimental design module 88 may determine that the estimated and extract system parameters indicate that the industrial system may perform more efficiently based on changing certain operating parameters. Alternatively, the experimental design module 88 may alert or otherwise inform a user that changes to certain operating parameters may result in an error or unexpected operation of the industrial system.

Accordingly, the present disclosure is directed to a digital twin control system for controlling operating of an industrial process. As described herein, the digital twin control system generally utilizes a model (e.g., the verified model 98) that is representative of the industrial process to generate an estimator module 86 and/or an experimental design module 88. In general, the estimator module 86 may be used to control operation of the industrial process even when certain states are not measurable by generating a state estimator that accounts for discrepancies between predicted process outputs and actual process outputs. The experimental design module 88 generally iterates through various operating parameters and determines operating parameters that are expected to produce a measurable change in the industrial process, which may provide information useful for users or operators for deciding modifications that may be made to equipment operating in the industrial process.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the embodiments described herein have been illustrated and described, many modifications and changes will occur to those skilled in the art. It is, therefore, to be understood that the appended claims are intended to cover all such modifications and changes as fall within the true spirit of the embodiments described herein.

The invention claimed is:

1. A method comprising:
receiving, via one or more processors, one or more process inputs and one or more process outputs associated with one or more operations of one or more components of an industrial automation system;
determining, via the one or more processors, a model representative of the one or more components based on the one or more process inputs and the one or more process outputs;
identifying, via the one or more processors, a boundary response time threshold associated with an unmeasured operating parameter of the one or more components based on the one or more process outputs;

determining, via the one or more processors, one or more inputs to modify the one or more operations of the one or more components based on the boundary response time threshold;

providing, via the one or more processors, the one or more inputs to the model;

receiving, via the one or more processors, one or more measured outputs of the one or more components after providing the one or more inputs to the model, wherein the one or more measured outputs are acquired a time period below the boundary response time threshold;

receiving, via the one or more processors, one or more predicted outputs from the model based on the one or more inputs;

determining, via the one or more processors, the unmeasured operating parameter based on a state estimator configured to employ the one or more predicted outputs and the one or more measured outputs to determine the unmeasured operating parameter; and adjusting, via the one or more processors, an electrical power provided to one or more motors associated with the one or more components based on the unmeasured operating parameter.

2. The method of claim 1, comprising identifying the boundary response time threshold by:

determining a maximum response time threshold of the one or more components;

performing a response to test to confirm the maximum response time threshold; and identifying the boundary response time threshold as a value less than or equal to the maximum response time threshold based on confirming the maximum response time threshold.

3. The method of claim 1, wherein the state estimator comprises an observer gain between the one or more predicted outputs and the one or more measured outputs.

4. The method of claim 1, comprising:

determining, via the one or more processors, a class associated with operation of the one or more components based on the unmeasured operating parameter, wherein the class comprises at least one of a linear time invariant, a linear time variant, or a nonlinear relationship between the operating parameter and the operation of the one or more components; and modifying, via the one or more processors, the operation based on the class.

5. The method of claim 1, wherein determining the model comprises:

receiving design information indicating an arrangement of one or more industrial automation components;

determining a motion profile of the one or more industrial automation components based on the design information; and determining the model based on the motion profile of the one or more industrial automation components.

6. The method of claim 1, wherein modifying the one or more operations of the one or more components based on the unmeasured operating parameter comprises:

generating a digital twin corresponding to the one or more operations based on the unmeasured operating parameter and the model; and adjusting the one or more operations in accordance with the digital twin.

7. The method of claim 1, wherein the one or more process inputs comprise measured sensor data, and wherein the unmeasured operating parameter is distinct from the one or more process inputs.

8. A non-transitory computer-readable medium comprising computer-executable instructions that, when executed, are configured to cause a processor to perform operations comprising:

receiving one or more process inputs and one or more process outputs associated with one or more operations of one or more components of an industrial automation system;

determining a model representative of the one or more components based on the one or more process inputs and the one or more process outputs;

identifying a boundary response time threshold associated with an unmeasured operating parameter of the one or more components based on the one or more process outputs;

determining one or more inputs to modify the one or more operations of the one or more components based on the boundary response time threshold;

providing the one or more inputs to the model;

receiving one or more measured outputs of the one or more components after providing the one or more inputs to the model, wherein the one or more measured outputs are acquired at a time period below the boundary response time threshold;

receiving one or more predicted outputs from the model based on the one or more inputs;

determining the unmeasured operating parameter based on a state estimator configured to employ the one or more predicted outputs and the one or more measured outputs to determine the unmeasured operating parameter; and adjusting an electrical power provided to one or more motors associated with the one or more components based on the unmeasured operating parameter.

9. The non-transitory computer-readable medium of claim 8, wherein the instructions that, when executed, are configured to cause the processor to determine the model comprises:

receiving design information indicating an arrangement of one or more industrial automation components;

determining a motion profile of the one or more industrial automation components based on the design information; and determining the model based on the motion profile of the one or more industrial automation components.

10. The non-transitory computer-readable medium of claim 9, wherein the design information comprises a computer-aided design file.

11. The non-transitory computer-readable medium of claim 8, wherein the unmeasured operating parameter comprises a position of the one or more components.

12. The non-transitory computer-readable medium of claim 8, wherein the unmeasured operating parameter comprises an applied torque of the one or more components.

13. The non-transitory computer-readable medium of claim 8, wherein the state estimator comprises an observer gain between the one or more predicted outputs and the one or more measured outputs.

14. The non-transitory computer-readable medium of claim 8, wherein the unmeasured operating parameter comprises one or more of a linear velocity of the one or more components, a linear acceleration of the one or more components, a rotational velocity of the one or more components, or a rotational acceleration of the one or more components.

15. A non-transitory computer-readable medium comprising computer-executable instructions that, when executed, are configured to cause a processor to perform operations comprising:
- receiving one or more process inputs and one or more process outputs associated with one or more operations of one or more components of an industrial automation system;
- determining a model representative of the one or more components based on the one or more process inputs and the one or more process outputs;
- identifying a boundary response time threshold associated with an unmeasured operating parameter of the one or more components based on the one or more process outputs;
- receiving an operating parameter from a sensor monitoring the one or more components that is controlled based on the model;
- determining that the operating parameter is outside of an operating parameter range associated with the model;
- performing a frequency sweep test, in accordance with the boundary response time threshold, based on the operating parameter being outside of the operating parameter range associated with the model;
- identifying an asymptote based on the frequency sweep test;
- determining that the operating parameter is indicative of a linear time invariant (LTI) system or a linear time variant (LTV) system based on the asymptote;
- determining one or more additional parameters outside of the operating parameter range based on the operating parameter being indicative of the linear time invariant (LTI) system or the linear time variant (LTV) system;
- modifying the model based on the one or more additional parameters; and
- adjusting an electrical power provided to one or more motors associated with the one or more components in accordance with the modified model.

16. The non-transitory computer-readable medium of claim 15, wherein the one or more additional parameters comprise modification to physical dimensions associated with the one or more components.

17. The non-transitory computer-readable medium of claim 15, wherein the instructions, when executed, that are configured to cause the processor to identify the boundary response time threshold comprise:
- determining a maximum response time threshold of the one or more components;
- performing a response to test to confirm the maximum response time threshold; and
- identifying the boundary response time threshold as a value less than or equal to the maximum response time based on confirming the maximum response time threshold.

18. The non-transitory computer-readable medium of claim 15, wherein the one or more components comprise one or more industrial automation components.

19. The non-transitory computer-readable medium of claim 15, wherein the one or more additional parameters comprise electrical modification associated with the one or more components.

20. The non-transitory computer-readable medium of claim 15, wherein the operating parameter comprises an unmeasured operating parameter of the one or more components.

* * * * *